United States Patent [19]

James et al.

[11] Patent Number: 4,469,130

[45] Date of Patent: Sep. 4, 1984

[54] ADJUSTABLE ORIFICE FOR REACTION INJECTION MOLDING

[75] Inventors: James R. James, Clarksville, Ind.; W. G. Cryderman, Birmingham, Mich.

[73] Assignee: Accuratio Systems Inc., Jeffersonville, Ind.

[21] Appl. No.: 410,382

[22] Filed: Aug. 23, 1982

[51] Int. Cl.³ .............................................. B01F 5/04
[52] U.S. Cl. ...................................... 137/606; 138/45; 138/46; 239/413; 251/121; 264/37; 366/150; 366/152; 425/130; 425/206
[58] Field of Search ................ 137/606, 607; 251/212, 251/121; 138/45, 46; 264/37; 521/917; 239/413; 425/130, 206; 366/150, 152

[56] References Cited

U.S. PATENT DOCUMENTS

| | | | |
|---|---|---|---|
| 3,135,292 | 6/1964 | Roberts | 251/324 X |
| 3,688,495 | 9/1972 | Fehler et al. | 251/141 X |
| 3,756,260 | 9/1973 | Fredd et al. | 251/212 X |
| 3,933,312 | 1/1976 | Fries | 425/130 X |
| 4,066,097 | 1/1978 | Fritsch | 137/563 |
| 4,081,863 | 3/1978 | Rees | 251/212 X |
| 4,193,546 | 3/1980 | Hetherington et al. | 239/413 X |

Primary Examiner—Martin P. Schwadron
Assistant Examiner—Stephen M. Hepperle

[57] ABSTRACT

An adjustable slotted orifice assembly for controlling the feed rate and dispersion pattern of high pressure impinging liquid reaction injection molding materials. In a preferred embodiment vibration of the variable orifice, opening particularly useful with low through puts, provides improved results.

17 Claims, 13 Drawing Figures

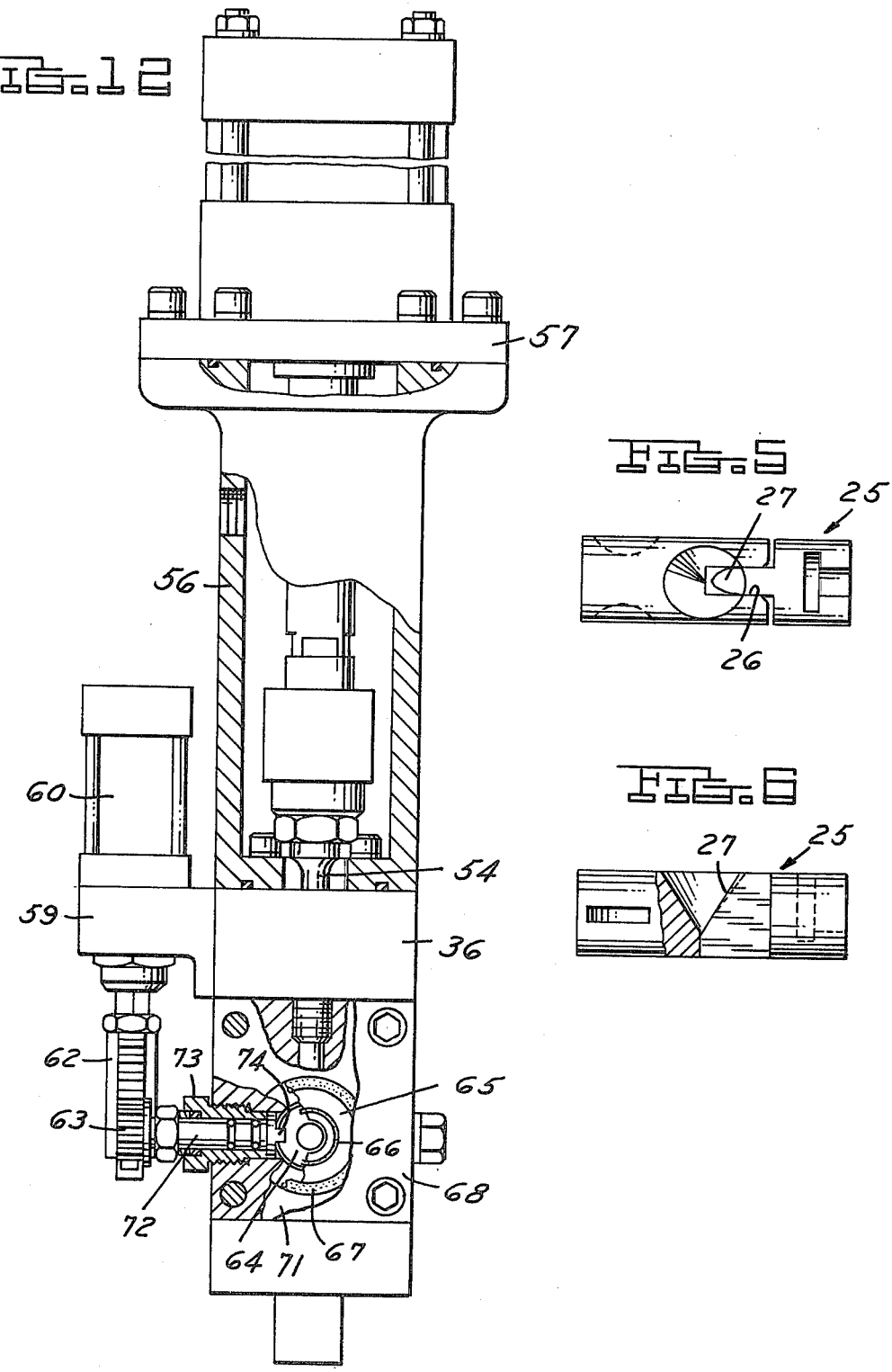

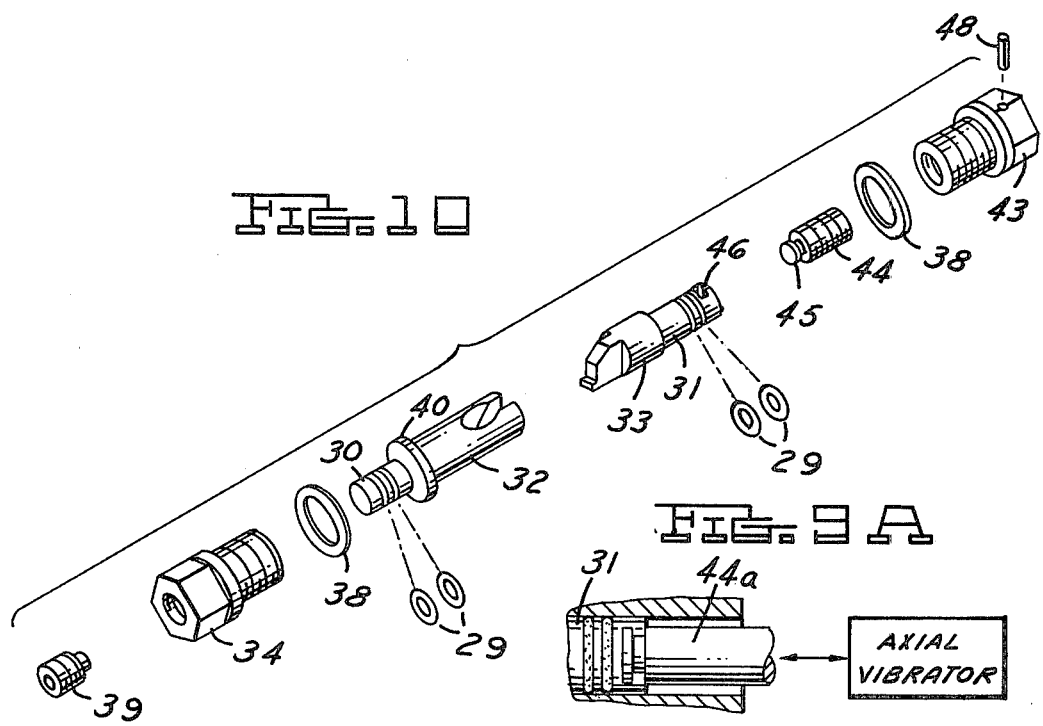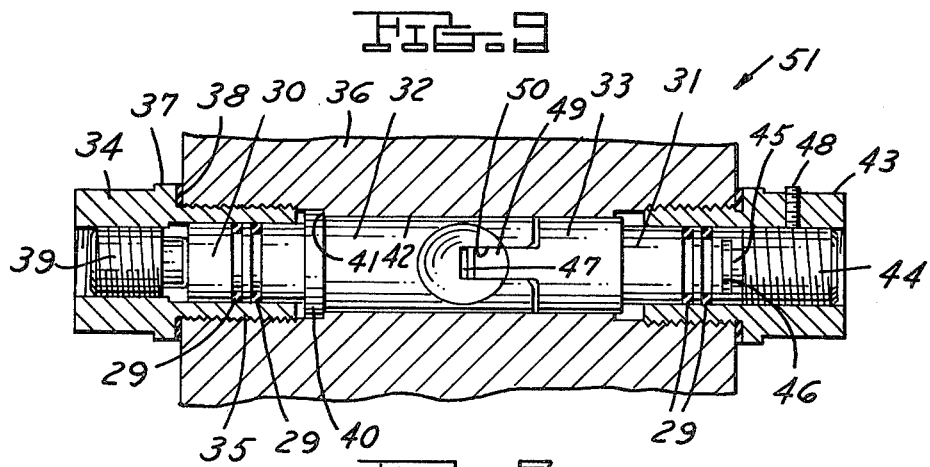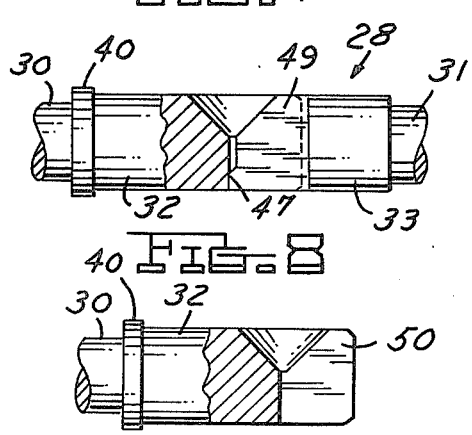

ADJUSTABLE ORIFICE FOR REACTION INJECTION MOLDING

BACKGROUND OF THE INVENTION

Prior art reaction injection molding (RIM) process involves high pressure impingement of multi-component materials such as urethanes, epoxys, silicone, polyesters and phenolics in a liquid form which react within the mold to form solic plastic products. Pressurized flow through restricted valve orifice openings causes heating of the materials with attendant changes in viscosity, flow rates and accuracy of injection charge both as to quantity and ratio required for optimum molded product results. The general prior art system for delivering pressurized flow of multi-components to a mixing head including an improved pressure developing and balancing circuit particularly adapted for the use of chopped glass fiber reinforcement (RRIM) is disclosed in co-pending application of co-inventor James R. James, Ser. No. 06/281,401, filed on July 8, 1981. The orifice system employed in such prior art mixing heads to accommodate different through-put applications involves use of multiple circular orifice openings of different size, any one of which for each material to be mixed could be moved into alignment with a matching opening in the other to cause impingement during the injection stroke.

A limitation of high pressure impingement mix heads has been found to exist, particularly in low through-put applications. In order to provide the pressures necessary for proper impingement mixing relatively small circular orifices have been necessary and as the through-put was reduced the orifice opening at some point became so small that it was subject to clogging by very small particles making a reliable production process difficult if not impossible to realize. Further it appeared that the mass of the small streams and difficulty in directing them minimized the mixing effectiveness. In addition the absence of adjustability for the individual orifices prevented monitoring of pressures and flow to maintain constant conditions in terms of volume and ratio of material for each injection stroke.

Conventional needle valve adjustment of orifice opening size is unsatisfactory due to the necessity of limiting flow in the form of a ring passage extending around the needle which facilitated clogging as compared to the equivalent passage size in the form of a open hole.

SUMMARY OF THE PRESENT INVENTION

A solution to the problem was developed in a progressive series of experimental orifices involving a variable orifice passage in the form of a rectangular slot, in lieu of a circular hole, which could be varied through the positioning of a complementary tang to bring about a variance in the width of the slot. In progressive experimental orifices improvements resulted in alignment control, sealing, reduction in clearance to a wipe out rod and finally to improve the mix by employing different width tangs relating to the length of the slot to optimize given ranges of through-put.

In addition to the concept of variable orifice the present invention comprehends vibration of the effective orifice size at a relatively high frequency with a controlled stroke between closed and some opening above the average level required for constant flow thereby providing self-cleaning of the orifice opening and an average flow at some rate substantially below that of an equivalent fixed orifice. In addition, by controlling the percentage of time the orifice is closed to open as well as the stroke of opening, through-put and ratio will be accurately controlled. Vibration can be produced by variable frequency solenoid or optionally by hydraulic cylinder or diaphragm.

It is contemplated that the use of vibrating orifice for all through-put ranges, particularly with use of glass filled materials, will assist in maintaining clean orifices and also allow a convenient means of automatically regulating pressures versus flow rates. It is also contemplated that pulsing action be synchronized for the two streams as contributing factor to produce effective optimum mixing of the two streams.

BRIEF DESCRIPTION OF THE DRAWINGS

FIG. 5 is a plan view of a second embodiment of the variable slotted orifice unit;

FIG. 6 is a partially sectioned side elevation of the orifice unit shown in FIG. 5;

FIG. 7 is a partially sectioned side elevation of a third preferred embodiment of the invention;

FIG. 8 is a partially sectioned side elevation of the left hand fixed female half of the orifice unit shown in FIG. 7;

FIG. 9 is a plan view of the complete orifice unit assembly employing the orifice unit of FIG. 7;

FIG. 9a is a fragmentary view of a vibrating orifice opening modification;

FIG. 10 is an exploded perspective view of the orifice unit assembly shown in FIG. 9;

FIG. 12 is a partially sectioned side elevation of the mixing head shown in FIG. 11.

With reference to FIG. 1 the orifice unit of the prior art achieved an adjustable through-put only by employing three alternative orifice passages 13a, 13b and 13c, each having a conical inlet 14, in a cylindrical valve unit 15 which can be moved axially to register with an inlet port for one of two materials to be injected into the mixing head with a corresponding valve unit for the other material likewise positioned axially with a corresponding orifice in alignment for impingement and mixing within the mixing head.

Figure 2:
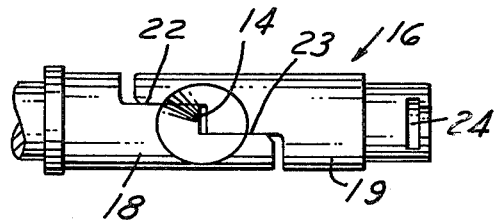
FIG. 2 is a plan view of a first embodiment of a variable slot orifice unit of the present invention.
Figure 3:
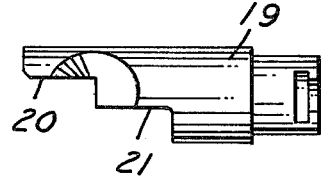
FIG. 3 is a plan view of the adjustable right hand half of the orifice unit shown in FIG. 2.
Figure 4:
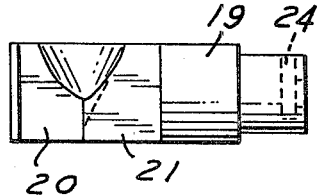
FIG. 4 is a side elevation of the half unit shown in FIG. 3.

Accurate control of total quantity of through put and ratio of the two materials employed involves a combination of factors including the viscosity of the liquid, which may vary with temperature, injection pressure and time as well as the size of the orifice opening. In order to achieve precision of control and mixing, continuous adjustability of orifice opening was first achieved with the embodiment of FIG. 2, 3, and 4 wherein the orifice unit 16 was provided with a variable slotted opening 17 by employing split orifice halves 18 and 19 of cylindrical configuration having axially extending flats 20 and 21 in the movable half 19 with matching flats 22 and 23 in the stationary half 18. A key slot 24 being provided in the movable half for coupling with an adjustment screw not shown.

Figure 1:
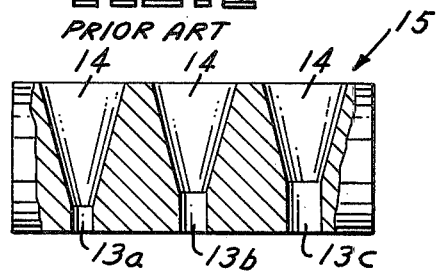
FIG. 1 is a sectional view of a prior art orifice unit employing three different fixed orifice opening sizes.

This adjustable orifice unit provided better mix and through-put control than was possible with a series of alternative fixed orifice openings such as shown in FIG. 1; however, the unit was subject to problems of alignment control and leakage.

With reference to the embodiment of FIGS. 5 and 6 variable orifice unit 25, provided with a female slot 26 and closely fitting male tongue 27, greatly improved alignment and control of the injected liquid stream; however adequate sealing of the orifice unit remained a problem. Also, with some chemical systems a small plug would form in the gap between the exit of the orifice and the wipe piston, later described with reference to the mixing head shown in FIGS. 11 and 12.

With reference to FIGS. 7, 8 and 9 a preferred embodiment of an orifice unit 28 includes construction with 0-ring seals 29 in integral extensions 30 and 31 of respective female and male orifice halves 32 and 33. Extension 30 fits within sleeve nut 34 having a threaded end 35 engaging orifice body 36 and having a shoulder 37 engaging sealing washer 38. Locking screw 39 in the threaded outer end of sleeve nut 34 fixedly positions female orifice half 32 with its shoulder 40 engaging counterbore 41 at the end of cylindrical bore 42 in body 36. At the other end adjustment sleeve nut 43 similarly receives and seals extension 31 while adjustment screw 44 with flanged extension 45 engages slotted recess 46 in extension 31 providing accurate adjustment of orifice opening 47 with preload screw 48 preventing any change in orifice opening through vibration in operation. Tang 49 of male orifice half 31 fits closely within slot 50 and female orifice half 32 so that through put is confined to orifice opening 47 adjusted through screw 44. The width of tang 49 initially 0.125" in a ⅜" diameter orifice assembly was found to provide a better mix for lower through-puts with a narrower tang so that in practice additional tang widths of 0.090" and 0.060" have been employed in alternative orifice assemblies typically used for through-puts of 45 lbs. per minute or less.

Figure 11:
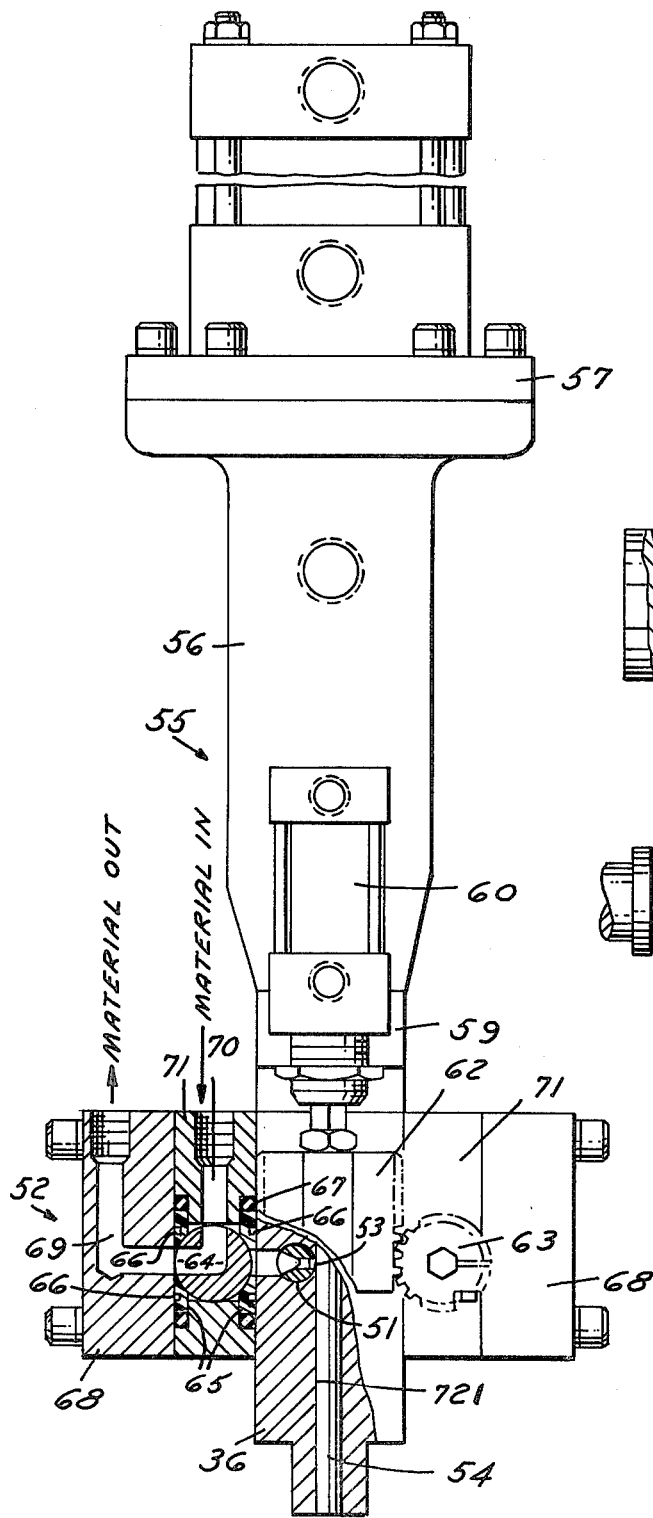
FIG. 11 is a partially sectioned front elevation of a high pressure mixing head employing the preferred embodiment of the orifice unit shown in FIGS. 9 and 10.

With reference to FIGS. 11 and 12 orifice assembly 51 for left side valve 52 is preferably installed with close tolerance at 53 to wipe piston 54 providing a gap between the exit portion of the orifice and wipe piston 54 in order of 0.005" in order to eliminate any plug in the gap encountered with some chemical systems when greater spacing was employed.

The system employing orifice valve assembly 51 in high pressure mixing head 55 includes (dioctyl phtholate) D.O.P. chamber 56 and hydraulic wipe cylinder 57 mounted on mix head block 36. On either side of mix head block 36 cylinder mount bracket 59 (only one shown) supports actuation cylinder 60 for driving actuation of rack 62 for valve gear 63 serving to rotate L-port ball valve 64 between bypass position shown in FIG. 11 and material injection position when rotated clockwise 90° C. Ball valve 64 is seated within dual ball seats 65 sealed by 0-rings 66 and 67 relative to mix head block 36 and valve end cap 68 which includes material outlet port 69 supplied from material inlet port 70 within valve body 71 when ball valve 64 in the position shown in FIG. 11. Valve gear 63 is mounted on the end of drive shaft 72 rotatable within pack sleeve 73 and having drive key 74 adapted to rotate ball valve 64 through 90° C. by actuation of rack 62.

Operation of the high pressure mixing head follows prior practice, preferably in accordance with co-pending U.S. patent application Ser. No. 06/281,401 wherein, with wipe piston 54 retracted and pressure built up on respective materials on both sides of the mixing head while the L ball valves are positioned as shown in FIG. 11, actuation cylinders 60 simultaneously rotate L valve balls 64 to injection position where flow through opposed adjustable orifices impinge to mix within chamber 721 for the duration of the injection cycle following which ball valves are returned to bypass position and wipe piston 54 injects the mixed material into mold cavities for the production part.

With reference to FIG. 9a, by replacing adjustment screw 44 with a slidable connecting rod 44a coupled with a suitable axial vibrator powered with a variable frequency by solenoid, hydraulic cylinder or diaphragm and employing stroke and frequency controls which are per se known in the art, the effective orifice opening at 47 may be caused to rapidly vibrate between closed and predetermined open position to provide a pulsing injection with through-put equal to a predetermined fractional value substantially below that of an equivalent fixed orifice. In addition to maintaining clean orifice openings, control of the vibration frequency, stroke and cycle characteristic permits through-put to be modulated and conveniently adjusted to effective mixing of desired quantity and ratio of multiple R.I.M. and R.R.I.M. components.

We claim:

1. Continuously variable orifice discharge means for use in high pressure multiple liquid component mixing heads such as employed in reaction injection molding systems characterized by:
   means for simultaneously supplying liquid components under pressure to multiple opposed orifice means for effective mixing impingement, each of said opposed orifice means comprising continuously variable orifice opening surface means relatively movable in a direction transverse to the direction of liquid flow to provide continuously variable adjustment of effective respective impinging discharge passage areas.

2. Orifice means as set forth in claim 1 wherein said surface means is split along the direction of flow.

3. Orifice means as set forth in claim 2 wherein said surface means provide a generally rectangular opening one rectangle dimension of which is adjustable.

4. Orifice means as set forth in claim 3 wherein orifice halves include said surface means together with cooperating relatively movable sealing surface means extending in the direction of said relative movement.

5. Orifice means as set forth in claim 4 wherein said orifice halves are provided with equal diameter exterior cylindrical configurations having an axis extending in the direction of said relative movement.

6. Orifice means as set forth in claim 5 wherein said sealing surfaces are flat contiguous surfaces extending from the orifice opening in respective orifice halves.

7. Orifice means as set forth in claim 6 wherein the sealing surfaces in one of said orifice halves are in the form of parallel female slot surfaces and in the other orifice half in the form of parallel tang surfaces slidable within said slot.

8. Orifice means as set forth in claim 7 wherein each of said cylindrical orifice halves is provided with an integral coaxial cylindrical extension having 0-ring seal means incorporated in the surface thereof.

9. Orifice means as set forth in claim 8 including an orifice housing having a cylindrical bore closely fitting said cylindrical orifice halves, a threaded counterbore at either end of said cylindrical bore, a threaded sleeve nut engaging each threaded counterbore, each sleeve nut having a cylindrical bore for receiving the 0-ring extension of an orifice half.

10. Orifice means as set forth in claim 9 wherein one of said cylindrical orifice halves is provided with a shouldered ring for engaging the outer end of one of said threaded counterbores, the corresponding sleeve nut including a threaded bore end for receiving a locking screw to engage the end of said orifice half to retain said shoulder engagement.

11. Orifice means as set forth in claim 10 including an exterior shoulder on said sleeve nut engaging the exterior end of said threaded counterbore with an interposed seal means therebetween.

12. Orifice means as set forth in claim 11 including a conical inlet formed in the respective orifice halves leading to the effective orifice opening between said halves, said orifice opening being limited to a small fraction of the diameter of said orifice halves at one side extremity thereof.

13. Orifice means as set forth in claim 12 wherein said housing includes a cylindrical mix chamber extending in close proximity to the cylindrical bore for said orifice halves on the outlet side of said orifice opening, and wipe piston means provided to move past the discharge side of said orifice opening on each injection stroke whereby any space between the discharge side of said orifice opening and said mix chamber susceptible to the accumulation of plugging material is minimized.

14. Orifice means as set forth in claim 13 including valve means for supplying liquid material under high pressure simultaneously for a controlled duration and to divert the flow away from said orifice means for recirculation at the end of each mix chamber fill cycle.

15. Orifice means as set forth in claim 14 wherein the other of said orifice halves includes means for axial sealed adjustment relative to its sleeve nut comprising a relatively rotatable coupling between the end of its said extension and an adjacent adjustment screw engaging a threaded bore end of said sleeve nut.

16. Orifice means as set forth in any of claims 1–14 including adjustable stroke vibrating means for rapidly changing the effective opening between relatively closed and open positions to effect a controlled through-put of a predetermined fractional value of a corresponding fixed opening.

17. Orifice means as set forth in claim 16 wherein vibration of respective multiple orifice means is synchronized to provide pulse impingement optimizing effective mixing.

* * * * *